United States Patent
Itagawa et al.

(10) Patent No.: US 10,771,400 B2
(45) Date of Patent: Sep. 8, 2020

(54) RELAY DEVICE

(71) Applicant: DENSO CORPORATION, Kariya, Aichi-pref. (JP)

(72) Inventors: Taichi Itagawa, Kariya (JP); Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 8 days.

(21) Appl. No.: 16/211,301

(22) Filed: Dec. 6, 2018

(65) Prior Publication Data

US 2019/0280989 A1    Sep. 12, 2019

(30) Foreign Application Priority Data

Mar. 9, 2018 (JP) .................................. 2018-43033

(51) Int. Cl.
*H04L 12/931* (2013.01)
*H04L 12/733* (2013.01)

(52) U.S. Cl.
CPC ............ *H04L 49/208* (2013.01); *H04L 45/20* (2013.01)

(58) Field of Classification Search
CPC ........... H04L 12/42; H04L 2012/40215; H04L 2012/40273; H04L 49/208; H04L 41/00; H04L 45/20
See application file for complete search history.

(56) References Cited

U.S. PATENT DOCUMENTS

| 7,200,148 | B1* | 4/2007 | Taylor | H04L 41/147 370/395.1 |
| 7,747,737 | B1* | 6/2010 | Apte | H04L 43/028 370/230.1 |
| 2002/0085585 | A1* | 7/2002 | Tzeng | H04L 12/5601 370/475 |
| 2013/0227566 | A1* | 8/2013 | Higuchi | G06F 9/45533 718/1 |
| 2015/0003457 | A1* | 1/2015 | Sugiyama | H04L 45/74 370/392 |
| 2015/0120916 | A1* | 4/2015 | Frattura | H04L 67/1095 709/224 |

(Continued)

FOREIGN PATENT DOCUMENTS

| JP | 2000-183936 A | 6/2000 |
| JP | 2013-192128 A | 9/2013 |

*Primary Examiner* — Asad M Nawaz
*Assistant Examiner* — Syed Ali
(74) *Attorney, Agent, or Firm* — Posz Law Group, PLC (57) ABSTRACT

A relay device in a communication network includes: a configuration determination unit determining whether a configuration frame is received; a comparison unit; first and second configuration units; and a configuration transfer unit. The comparison unit determines whether the propagation number at reception time is equal to the total number of target devices in a configuration frame. When the propagation number is not equal to the total number, the first configuration unit sets a port in the transfer destination information to the mirror output port. When the propagation number is not equal to the total number, the configuration transfer unit outputs the updated configuration frame from the mirror input port. When the propagation number is equal to the total number, the second configuration unit sets a port in the transfer destination information to the mirror output port.

8 Claims, 5 Drawing Sheets

(56) References Cited

U.S. PATENT DOCUMENTS

| | | | |
|---|---|---|---|
| 2015/0288559 A1* | 10/2015 | Yasuda | H04L 41/0654 370/217 |
| 2015/0288620 A1* | 10/2015 | Yasuda | H04L 49/552 370/401 |
| 2016/0156516 A1* | 6/2016 | Nishi | H04L 43/0829 370/329 |
| 2017/0034065 A1* | 2/2017 | Iwakura | H04L 47/32 |
| 2017/0353478 A1* | 12/2017 | Ishikawa | H04L 12/4666 |
| 2019/0173806 A1* | 6/2019 | Kaku | H04L 12/42 |

* cited by examiner

| | | TOTAL NUM OF HOPS | I/O INF | HOP=1 | | HOP=2 | | HOP=3 | | HOP=4 | | ... |
|---|---|---|---|---|---|---|---|---|---|---|---|---|
| | | | | TRANS DEST PORT | TRANS SOURCE PORT | TRANS DEST PORT | TRANS SOURCE PORT | TRANS DEST PORT | TRANS SOURCE PORT | TRANS DEST PORT | | ... |
| 1 | ECU21 | 1 | I | 1 | 2 | EOF | — | — | — | — | — | ... |
| 2 | ECU22 | 2 | I | 1 | 6 | 1 | 7 | EOF | — | — | — | ... |
| 3 | ECU23 | 3 | I | 1 | 6 | 1 | 6 | 1 | 7 | EOF | — | ... |
| 4 | ECU24 | 3 | I | 1 | 6 | 1 | 6 | 1 | 5 | EOF | — | ... |
| 5 | ECU26 | 2 | I | 1 | 5 | 1 | 4 | EOF | — | — | — | ... |
| 6 | ECU25 | 3 | I | 1 | 6 | 1 | 5 | 1 | 4 | EOF | — | ... |
| .. | .. | .. | .. | .. | .. | .. | .. | .. | .. | .. | .. | .. |

RELAY DEVICE

CROSS REFERENCE TO RELATED APPLICATION

The present application claims the benefit of priority from Japanese Patent Application No. 2018-43033 filed on Mar. 9, 2018. The entire disclosure of the above application is incorporated herein by reference.

TECHNICAL FIELD

The present disclosure relates to a relay device configuring a communication network.

BACKGROUND

The configuration that any of multiple relay devices performs port mirroring, and a frame mirrored by the port mirroring (that is, replicated) is transferred to a monitoring device of the frame through one or more other relay devices is referred to herein as remote monitoring.

Regarding the remote monitoring, a tunnel for transferring a mirror frame from a switch that has performed port mirroring to a measurement device connected to another switch is configured by distributing a label table to each switch as multiple relay devices from a management server. The mirror frame is a mirrored frame. The tunnel is considered to correspond to a transfer path of the mirror frame.

SUMMARY

According to an aspect of the present disclosure, a relay device as each of a plurality of relay devices in a communication network, includes: a configuration determination unit configured to determine whether a configuration frame is received; a comparison unit; a first configuration unit; a configuration transfer unit; and a second configuration unit. The comparison unit determines whether the propagation number at reception time is equal to the total number of target devices in a configuration frame. When the propagation number is not equal to the total number, the first configuration unit sets a port in the transfer destination information to the mirror output port. When the propagation number is not equal to the total number, the configuration transfer unit outputs the updated configuration frame from the mirror input port. When the propagation number is equal to the total number, the second configuration unit sets a port in the transfer destination information to the mirror output port.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described below with reference to the drawings.

Regarding remote monitoring, a tunnel for transferring a mirror frame from a switch that has performed port mirroring to a measurement device connected to another switch is configured by distributing a label table to each switch as multiple relay devices from a management server. The mirror frame is a mirrored frame. The tunnel is considered to correspond to a transfer path of the mirror frame.

In the above feature, it is not clear how the remote monitoring configuration for each switch (that is, each relay device) is performed by information from the management server.

The configuration related to remote monitoring is the configuration of at least the following items (1) to (4).

(1) Item as to which relay device among the multiple relay devices configures the mirror execution device. The mirror execution device is a relay device that implements the port mirroring.

(2) Item as to which port is used as a monitor port and which port is used as a mirror output port in the mirror execution device. The monitor port is a port subject to port mirroring. The mirror output port is a port (that is, mirror port) for outputting the mirror frame.

(3) Item as to which relay device among the multiple relay devices serves as the mirror transfer device. The mirror transfer device is a relay device that transfers the mirror frame from the mirror execution device to a monitoring device.

(4) Item as to which port is the mirror input port and which port is the mirror output port in the mirror transfer device. The mirror input port is a port to which the mirror frame is input from another relay device.

It is an object of the present disclosure to provide a new technique which is capable of facilitating the configuration for remote monitoring.

According to an aspect of the present disclosure, a relay device as each of a plurality of relay devices in a communication network, includes: a configuration determination unit configured to determine whether a configuration frame is received; a comparison unit; a first configuration unit; a configuration transfer unit; and a second configuration unit. The configuration frame provides to transfer a mirror frame from one of the relay devices to a monitor device via another one of the relay devices. The mirror frame is duplicated by executing a port mirroring in the one of the relay devices. The one of the relay devices executing the port mirroring is defined as an execution relay device. The other one of the relay devices disposed in a transfer path between the execution relay device and the monitor device and transferring the mirror frame is defined as a transfer relay device. Each of the execution relay device and the transfer relay device is defined as a target relay device. One of the target relay devices initially connecting to the monitor device is defined as a first-stage relay device. The configuration frame is initially input into the first-stage relay device, and propagates through each target device. The configuration frame includes a configuration information region for storing a propagation number information, a total number of the target devices, a transfer destination information and a transfer source information. The propagation number information indicates a numerical number of propagations as a numerical number of target devices to which the configuration frame has propagated. The configuration frame propagates in a propagation order of the target devices. The first-stage relay device has a first order of the propagation order. The transfer destination information and the transfer source information relates to the target devices in the propagation order in association with each propagation order. The transfer destination information indicates an mirror output port that outputs the mirror frame to be transferred to the monitoring device. The transfer source information recorded in association with a same order of the propagation order as the total number of the target devices indicates a monitor port as an object of the port mirroring. The transfer source information recorded in association with an order of the propagation order smaller than the total number of the target devices indicates a mirror input port to which the mirror frame is input from the other one of the relay devices. The comparison unit determines whether the numerical number of propagations at reception time is equal to the total number of the target devices in a received configuration frame when the configuration determination unit determines that the configuration frame is received. The numerical number of propagations at the reception time is indicated by the propagation number information in the received configuration frame. When the comparison unit determines that the numerical number of propagations at the reception time is not equal to the total number of the target devices, the first configuration unit: sets the relay device to function as the transfer relay device; sets a port indicated in the transfer source information to be the mirror input port when the transfer source information and the transfer destination information in the configuration information region of the configuration frame are associated with the same order of the propagation order as the numerical number of propagations at the reception time; and sets a port indicated in the transfer destination information to be the mirror output port. When the comparison unit determines that the numerical number of propagations at the reception time is not equal to the total number of the target devices, the configuration transfer unit: updates the propagation number information in the configuration frame to be new propagation number information indicating the numerical number of propagations incremented by 1 from the numerical number of propagations at the reception time; and outputs the configuration frame after the propagation number information is updated from the port set as the mirror input port by the first configuration unit. When the comparison unit determines that the numerical number of propagations at the reception time is equal to the total number of the target devices, the second configuration unit: sets the relay device to function as the execution relay device; sets a port indicated in the transfer source information to be the monitor port when the transfer source information and the transfer destination information in the configuration information region of the configuration frame are associated with the same order of the propagation order as the numerical number of propagations at the reception time; and sets a port indicated in the transfer destination information to be the mirror output port.

The configuration determination unit determines whether or not the configuration frame has been received.

The configuration frame is a frame for allowing the mirror frame duplicated by the port mirroring performed by any of the multiple relay devices to be transferred to the monitoring device 30 through another relay device. The other relay device referred to herein is a relay device that is not a relay device that has performed the port mirroring. The monitoring device is a device for monitoring the mirror frame. In other words, the configuration frame is a frame for configuration related to remote monitoring.

The configuration frame is first input to a first stage device, which is a target device to which the monitoring device is connected, of target devices, which are an execution device as the relay device that performs the port mirroring, and a transfer device as a relay device that exists in a transfer path between the execution device and a monitoring device and transfers the mirror frame from the execution device. The configuration frame is propagated to each target device. The propagation of the configuration frame to each target device is realized by a configuration transfer unit which will be described later. The execution device corresponds to the mirror execution device described above, and the transfer device corresponds to the mirror transfer device described above.

The configuration frame records the propagation number information indicating the number of propagations as the number of target devices to which the configuration frame has propagated and the total number of target devices, and includes the configuration information region.

In the configuration information region, the transfer destination information and the transfer source information about the target devices having the propagation order are recorded in association with each of the propagation orders, which are the order of the target devices to which the configuration frame is propagated, with the first stage device as a first order.

The transfer destination information indicates a port to which the mirror frame is to be output in order to transfer the mirror frame to the monitoring device, that is, the mirror output port.

Among the transfer source information, the transfer source information recorded in association with the same number of propagation orders as the total number indicates a port to be subjected to the port mirroring, that is, the monitor port. Among the transfer source information, the transfer source information recorded in association with the propagation order of a number smaller than the total number indicates a port to which the mirror frame is input from another relay device, that is, the mirror input port.

Then, in the relay device, when an affirmative determination is made by the configuration determination unit, that is, when it is determined that the configuration frame is received, the comparison unit determines whether or not the number of propagation at the time of reception, which is the number of propagations indicated by the propagation number information in the received configuration frame, is equal to the total number in the received configuration frame. Note that "in the configuration frame" means "recorded in the configuration frame".

The first configuration unit sets the relay device so as to function as the transfer device when a negative determination is made by the comparison unit, that is, when it is determined that the total number is not equal to the number of propagations at the time of reception. Further, the first configuration unit sets a port indicated by the transfer source information as the mirror input port in the relay device, among the transfer destination information and the transfer source information associated with the same number of propagation orders as the number of propagations at the time of reception in the configuration information region of the received configuration frame, and sets a port indicated by the transfer destination information as a mirror output port in the relay device. The first configuration unit performs the configuration of the items (3) and (4). The expression "associated with the propagation order" means "recorded corresponding to the propagation order".

When the comparison unit makes the negative determination, the configuration transfer unit updates the propagation number information in the received configuration frame to the propagation number information indicating the number of propagations incremented by 1 from the number of propagations at the time of reception, and outputs the configuration frame after the propagation number information is updated from the port set as the mirror input port by the first configuration unit. The configuration transfer unit realizes the propagation of the configuration frame between the target devices.

The second configuration unit sets the relay device so as to function as the execution device when the comparison unit makes the affirmative determination, that is, when the total number and the number of propagations at the time of reception are determined to be equal to each other. Further, the second configuration unit sets a port indicated by the transfer source information as the monitor port in the relay device, and sets a port indicated by the transfer destination information as the mirror output port in the relay device among the transfer destination information and the transfer source information associated with the same number of propagation orders as the number of propagations at the time of reception in the configuration information region of the received configuration frame. The second configuration unit performs the configuration of the above items (1) and (2).

According to the relay device configured as described above, when the configuration frame is input to any port of the relay device which has become the first stage device, the configuration frame is propagated to the relay device which is the execution device, and the configuration of the above items (1) to (4) is completed. Therefore, configuration related to remote monitoring becomes easy. Incidentally, the propagation number information in the configuration frame input to the first stage device may be set to the propagation number information indicating 1, which means the first propagation, as the number of propagations.

1. Configuration

Figure 1:
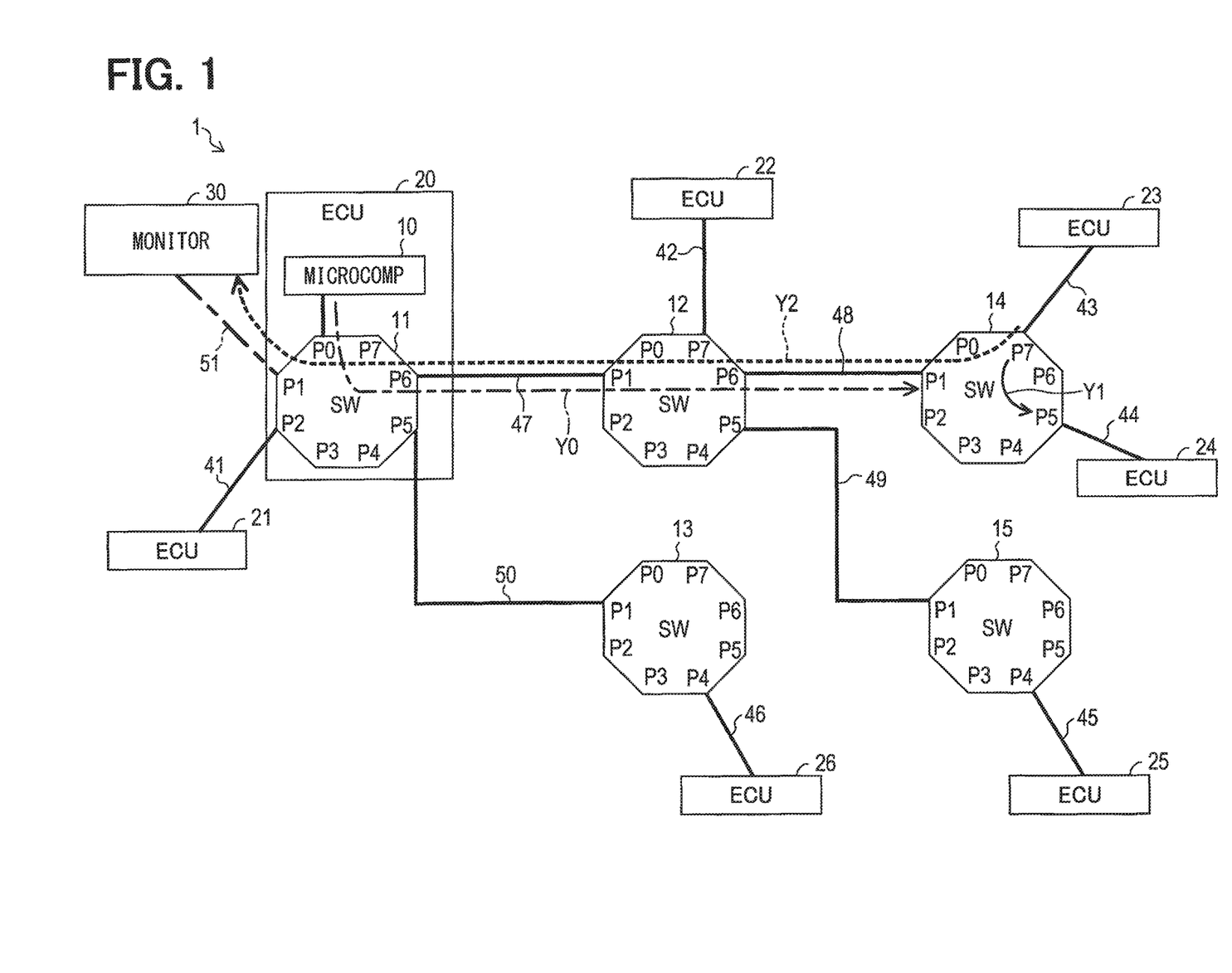
FIG. 1 is a configuration diagram showing a communication network in which a switch is used as a relay device according to an embodiment.

A communication network 1 according to an embodiment shown in FIG. 1 is, for example, an Ethernet network mounted on a vehicle such as a passenger car, and configures a communication system in the vehicle. Ethernet is a registered trademark.

As shown in FIG. 1, a communication network 1 includes Ethernet switches 11 to 15 (hereinafter referred to as a switch), which are Ethernet network switches, as multiple relay devices. In FIG. 1 and other figures to be described later, the switch is referred to as "SW". The number of switches may be other than five.

Among the switches 11 to 15, the switch 11 is built in an electronic control device (hereinafter referred to as an ECU) 20. The ECU is an abbreviation for "Electronic Control Unit". The communication network 1 includes ECUs 21 to 26 as devices that communicate through any one or more of the switches 11 to 15.

The switches 11 to 15 are, for example, layer 2 switches (that is, L2 switches), and perform a communication for relaying in accordance with the Ethernet standard. Each of the switches 11 to 15 includes multiple (for example, eight) ports P0 to P7. In the communication network 1, at least one of the multiple ports P0 to P7 included in each of the switches 11 to 15 is connected to a port of another switch.

The ECU 21 is connected to the port P2 of the switch 11 through a communication line 41. The ECU 22 is connected to the port P7 of the switch 12 through a communication line 42. The ECU 23 is connected to the port P7 of the switch 14 through a communication line 43. The ECU 24 is connected to the port P5 of the switch 14 through a communication line 44. The ECU 25 is connected to the port P4 of the switch 15 through a communication line 45. The ECU 26 is connected to the port P4 of the switch 13 through a communication line 46.

The port P6 of the switch 11 and the port P1 of the switch 12 are connected to each other through a communication line 47. The port P6 of the switch 12 and the port P1 of the switch 14 are connected to each other through a communication line 48. The port P5 of the switch 12 and the port P1 of the switch 15 are connected to each other through a communication line 49. The port P5 of the switch 11 and the port P1 of the switch 13 are connected to each other through a communication line 50.

A microcomputer 10 (hereinafter referred to as a microcomputer) as an arithmetic device provided in the ECU 20 is connected to the ports P0 of the switch 11. For that reason, the microcomputer 10 of the ECU 20 can communicate with the ECU 21 through the switch 11. The microcomputer 10 can also communicate with the ECUs 22 to 26 through the switch 11 and any one or more of the other switches 12 to 15. Though not shown, each of the ECUs 21 to 26 is also provided with a microcomputer as an arithmetic device. The microcomputer includes semiconductor memories (hereinafter referred to as memory) such as a CPU, a ROM, and a RAM.

A monitoring device 30 for monitoring a frame flowing through the communication network 1 is detachably connected to an end of the communication line 51 connected to the port P1 of the switch 11.

2. Table Showing Configuration of Remote Monitoring

In the communication network 1, a remote monitoring is performed.

A configuration of the remote monitoring, that is, a configuration of a transfer path between the switch 11 connected with the monitoring device 30 is connected and the switch for performing the port mirroring (hereinafter referred to as a mirror execution switch) can be regarded as a tree configuration starting from the switch 11. For that reason, the configuration of the remote monitoring can be represented by a table shown in FIG. 2 (a tabular database). Hereinafter, a switch that relays the mirror frame transmitted by the mirror execution switch to the monitoring device 30 is referred to as a mirror transfer switch. The mirror execution switch corresponds to an execution device, and the mirror transfer switch corresponds to a transfer device. When the switches 11 to 15, the ports P0 to P7, the ECUs 20 to 26, and the like are not particularly distinguished from each other, the reference numerals will be omitted.

A table of FIG. 2 will be described.

A term "hop" means the number of hops. If n is an integer of 1 or more, "hop=n" means that the number of hops is n. Here, the number of hops indicates the order of the switches in which the frame input to the switch 11 propagates with the switch 11 connected to the monitoring device 30 as the first, in other words, indicates the order of connection of each switch with the switch 11 as the first. The switch 11 corresponds to a first stage device, and the number of hops corresponds to the propagation order.

Figure 2:
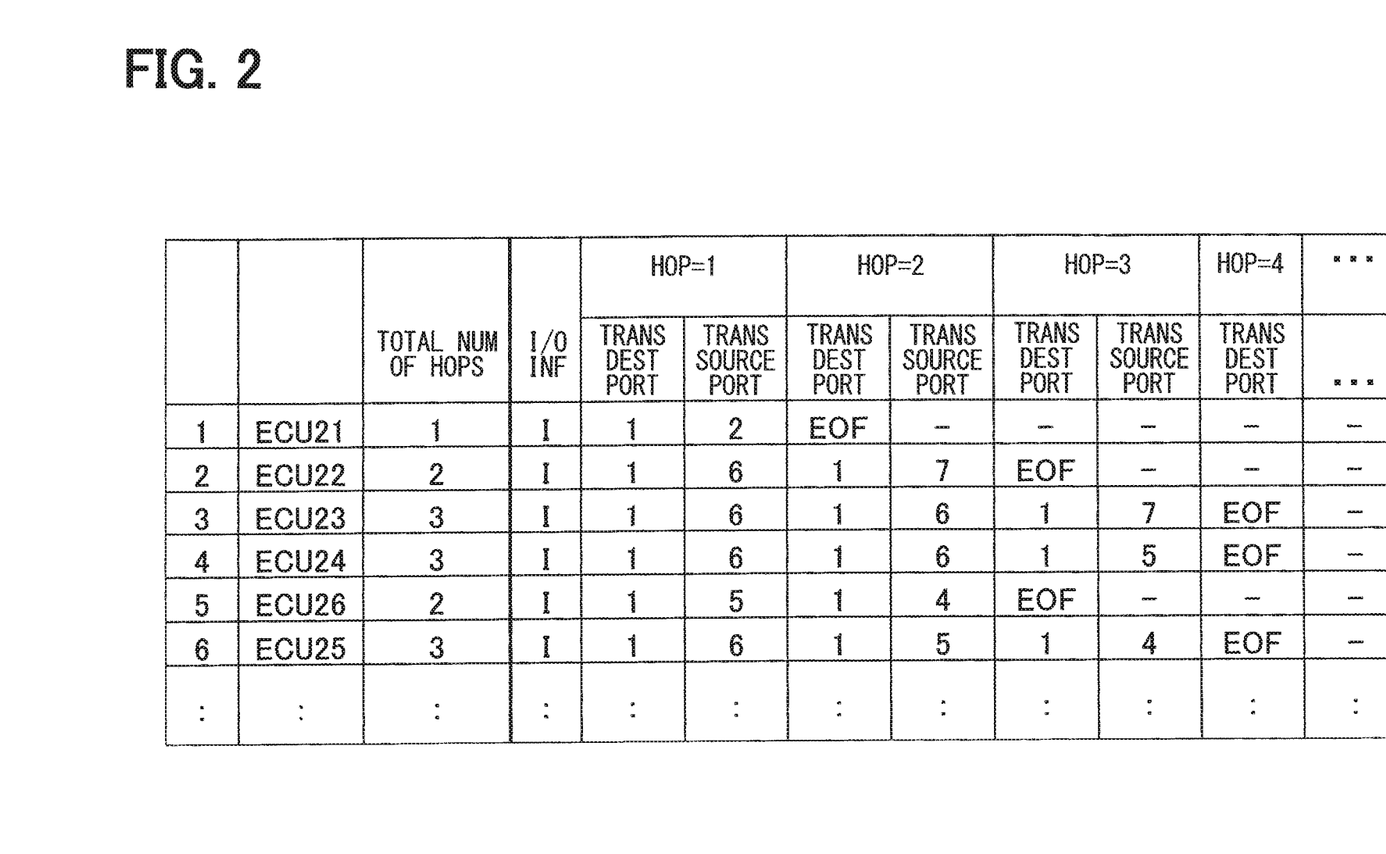
FIG. 2 is an illustrative diagram of a table showing a configuration of remote monitoring.

In the table of FIG. 2, the information recorded on a right side of an ECU name in each row numbered 1, 2, 3, . . . at a left end is configuration information indicating the configuration of remote monitoring in the case where each ECU is a target of remote monitoring. A symbol EOF is a mark indicating an end of the content of the configuration information. That is, in each row of the table, the information recorded from the total number of hops to the immediately preceding EOF, that is, the left side, is substantial configuration information.

The total number of hops is the number of switches present between the target ECU and the monitoring device 30. In other words, the total number of hops is the number of switches (hereinafter referred to as configuration target switches) to be configured for remote monitoring. To describe the configuration target switch, first, the switch to which the target ECU is connected becomes the mirror execution switch. The switch existing in the transfer path between the mirror execution switch and the monitoring device 30 serves as a mirror transfer switch. Each of the mirror execution switch and the mirror transfer switch becomes the configuration target switch. The configuration target switch corresponds to the target device, and the total number of hops corresponds to the total number of target devices.

In each row of the table of FIG. 2, before EOF, a transfer destination port corresponding to the transfer destination information and a transfer source port corresponding to the transfer source information are recorded for each number of hops. Each of the transfer destination port and the transfer source port to be recorded is actually the number of the corresponding port (for example, 0 to 7). Also, in FIG. 2, the port is described as "port".

The number of hops equal to the total number of hops is the number of hops of the mirror execution switch. For that reason, in each row of the table of FIG. 2, the transfer destination port and the transfer source port recorded in association with the number of hops equal to the total number of hops are the transfer destination port and the transfer source port for the mirror execution switch.

The number of hops smaller than the total number of hops is the number of hops of the mirror transfer switch. For that reason, in each row of the table of FIG. 2, the transfer destination port and the transfer source port recorded in association with the number of hops smaller than the total number of hops are the transfer destination port and the transfer source port for the mirror transfer switch.

Among the transfer source ports recorded in the table of FIG. 2, the transfer source port recorded in association with the number of hops equal to the total number of hops indicates a monitor port, and the transfer source port recorded in association with the number of hops smaller than the total number of hops indicates a mirror input port. As described above, the monitor port is a port to be subjected to port mirroring, and the mirror input port is a port to which the mirror frame is input from another switch. The monitor port is also a port to which the target ECU is connected.

The transfer destination port recorded in the table of FIG. 2 indicates a mirror output port. In other words, in the mirror execution switch, the transfer destination port is a port for outputting a mirror frame duplicated by the switch to be transferred to the monitoring device 30, and in the mirror transfer switch, the transfer destination port is a port for outputting a mirror frame from another switch to be transferred to the monitoring device 30.

In each row of the table of FIG. 2, I/O information indicates whether the port mirroring to be executed is the reception mirror or the transmission mirror. The reception mirror is to mirror the frame received from the monitor port, that is, the frame transmitted by the target ECU. The transmission mirror mirrors a frame transmitted from the monitor port, that is, a frame transmitted to the target ECU. As the I/O information, a symbol "I" shown in FIG. 2 indicates the reception mirror. If the I/O information is the transmission mirror, the I/O information becomes "O", for example.

For example, when it is considered that remote monitoring is performed by the reception mirror with the ECU 23 as a target, the configuration information of the remote monitoring is the configuration information shown in a third row in the table of FIG. 2, that is, a row having the leftmost number of 3. In the configuration information of the third line, the switches 11, 12, and 14 are specified as the configuration target switches based on a connection relationship between the transfer destination port and the transfer source port recorded for each number of hops. It is indicated that the port P7 of the third switch 14 having the first switch 11 is the monitor port of the reception mirror, and the port P1 of the switch 14 is the mirror output port. Further, it is indicated that the port P6 of the second switch 12 is a mirror input port and the port P1 of the switch 12 is a mirror output port, and that the port P6 of the switch 11 is a mirror input port and the port P1 of the switch 11 is a mirror output port.

The table of FIG. 2 is recorded in a memory (for example, a ROM) of the microcomputer 10.

3. Configuration Frame

The microcomputer 10 transmits a configuration frame in order to perform configuration related to remote monitoring. The configuration frame transmitted from the microcomputer 10 is input to the port PD of the switch 11, and then propagated to each of the configuration target switches including the switch 11. The configuration frame will be described with reference to FIG. 3.

First, a normal frame (hereinafter referred to as a normal frame), which is not a configuration frame, will be described. The normal frame is a normal Ethernet frame.

Figure 3:
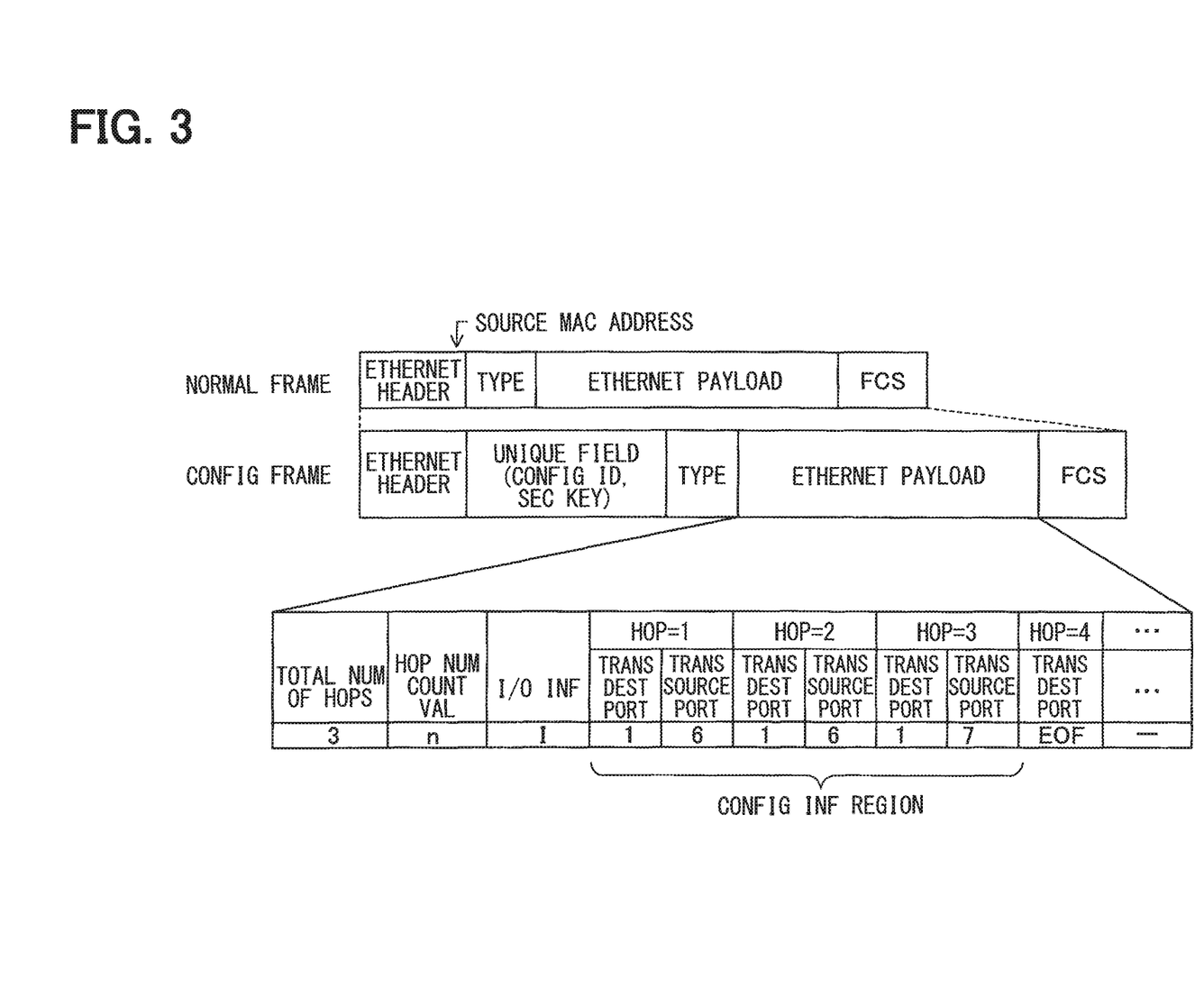
FIG. 3 is an illustrative diagram illustrating a configuration of a frame.

As shown in the first stage of FIG. 3, the normal frame includes fields of an Ethernet header, a type, an Ethernet payload, and an FCS. The source MAC address (that is, a transmission source MAC address) is stored at an end of the Ethernet header. An Ethernet payload is a body of data that is transferred in a frame. A symbol FCS is an abbreviation for "Frame Check Sequence".

On the other hand, as shown in the second row of FIG. 3, in the configuration frame, a field is added at a predetermined position in comparison with the normal frame. A field added to the normal frame is called a unique field. The unique field is added, for example, between the Ethernet header and the type field, that is, between the source MAC address and the type field.

In the unique field of the configuration frame, an identifier (hereinafter referred to as a configuration identifier), which is a code of one or more bits indicating that the frame is the configuration frame, and a security key for authentication are recorded. The security key is a mufti-bit code for verifying that the configuration frame is a frame transmitted from a normal device, that is, the microcomputer 10 in the present embodiment.

The Ethernet payload of the configuration frame stores the configuration information recorded for the ECU which is the target of remote monitoring among the configuration information recorded for each ECU in the table of FIG. 2. Incidentally, the configuration frame shown in FIG. 3 is a configuration frame when remote monitoring is performed by the reception mirror with the ECU 23 as a target.

Further, the hop number count value is recorded at a predetermined position in the Ethernet payload of the configuration frame. In the present embodiment, the hop number count value is recorded between the total number of hops and the I/O information.

The hop number count value indicates the number of configuration target switches (that is, the number of propagations) through which the configuration frame has propagated. In the present embodiment, the hop number count value indicates the propagation number as it is, but it is sufficient if there is a one-to-one correspondence between the hop number count value and the number of propagations. The hop number count value in the configuration frame output from the microcomputer 10 is set to a value indicating a first propagation, that is, 1 in the present embodiment.

The hop number count value corresponds to the propagation number information. In the following description, as shown in FIG. 3, an region in which a transfer destination port corresponding to "the number of hops=1" to a transfer source port corresponding to the same number of hops as the total number of hops are recorded in the Ethernet payload of the configuration frame is referred to as a configuration information region. In the above configuration information region, the transfer destination port and the transfer source port of the configuration target switch corresponding to the number of hops are recorded in association with each hop number from 1 to the same number as the total number of hops.

4. Processing

Next, processing performed by each of the switches 11 to 15 in connection with remote monitoring will be described with reference to FIGS. 4 and 5.

[4-1. Configuration Process]

First, a configuration process performed by each of the switches 11 to 15 for executing a configuration in the switch based on the configuration frame from the microcomputer 10 will be described with reference to FIG. 4. In FIG. 4, the hop number count value is simply described as a count value.

Figure 4:
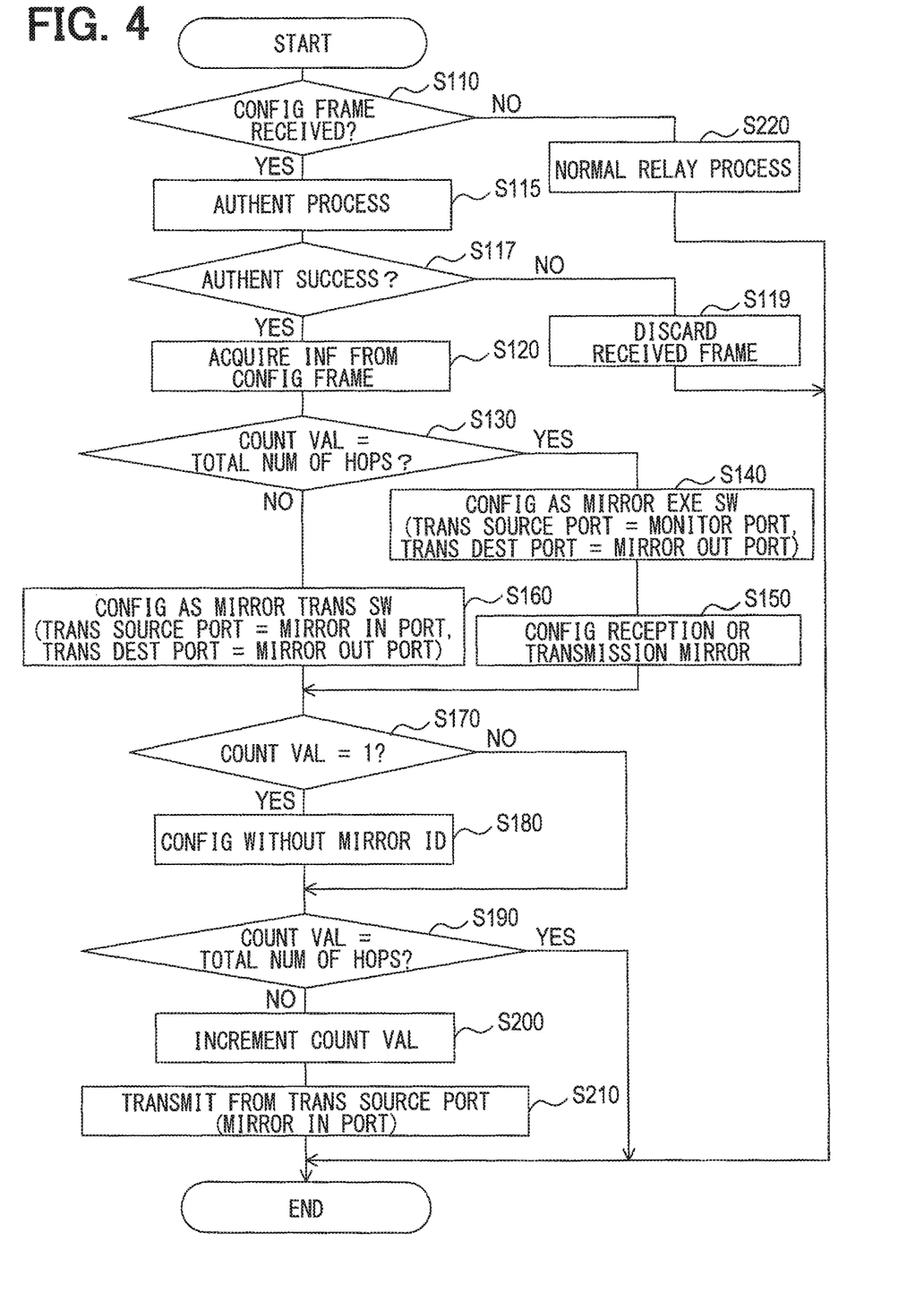
FIG. 4 is a flowchart showing a configuration process for remote monitoring.

When a frame is received from any of the ports P0 to P7, the switch performs the configuration process of FIG. 4.

As shown in FIG. 4, in S110, the switch determines whether or not the received frame (hereinafter referred to as a received frame) is a configuration frame, that is, whether or not the configuration frame has been received. Specifically, the switch determines whether or not the unique field is added to the received frame and the configuration identifier is recorded in the unique field. If the configuration identifier is recorded in the unique frame, that is, if the configuration identifier is included in the received frame, the switch determines that the configuration frame has been received.

When it is determined in S110 that the configuration frame has not been received, the switch proceeds to S220, and performs a process of relaying the received frame as the normal frame. In other words, a normal relay process is performed on the received frame. Thereafter, the switch ends the configuration process.

When it is determined in S110 that the configuration frame has been received, the switch proceeds to S115 and performs an authentication process using a security key included in the configuration frame. For example, the switch performs a predetermined calculation on the security key included in the configuration frame, and if the calculation result is a correct value, the switch determines that the authentication has succeeded, and if the calculation result is not a correct value, the switch determines that the authentication has failed.

In a next S117, the switch determines whether or not the authentication has succeeded by the authentication process in S115, and if the authentication has not succeeded, the switch discards the received configuration frame in S119, and then ends the configuration process.

If it is determined in S117 that the authentication has succeeded in the authentication process, the switch proceeds to S120 and acquires information from the received configuration frame. Specifically, the switch acquires the total number of hops, the hop number count value, and the I/O information from the configuration frame. Further, the switch acquires the transfer destination port and the transfer source port recorded corresponding to the number of hops equal to the hop number count value from the configuration information region in the configuration frame. The hop number count value acquired from the configuration frame in S120 corresponds to the number of propagations at the time of reception.

In a next S130, the switch determines whether or not the total number of hops and the hop number count value acquired in S120 are equal to each other, and if it is determined that the total number of hops and the hop number count value are equal to each other, the switch proceeds to S140.

In S140, the switch is configured so that the switch functions as the mirror execution switch. For example, the switch sets a flag indicating that the switch functions as the mirror execution switch. Further, in S140, the switch sets the transfer source port acquired in S120 as the monitor port in the switch, and sets the transfer destination port acquired in S120 as the mirror output port in the switch.

In a next S5150, the switch configures the reception mirror or the transmission mirror based on the I/O information acquired in S120. Specifically, if the I/O information acquired from the configuration frame is "I" indicative of the reception mirror, the switch performs the configuration of executing the reception mirror as the port mirroring, and if the I/O information is "O" indicative of the transmission mirror, the switch performs the configuration of executing the transmission mirror as the port mirroring. After performing the processing of S150, the switch proceeds to S170.

When it is determined by the switch in S130 that the total number of hops is not equal to the hop number count value, the process proceeds to S160.

In S160, the switch is set so that the switch functions as a mirror transfer switch. For example, the switch sets a flag indicating that the switch functions as the mirror transfer switch. Further, in S160, the switch sets the transfer source port acquired in S120 as the mirror input port in the switch, and sets the transfer destination port acquired in S120 as the mirror output port in the switch. After performing the processing of S160, the switch proceeds to S170.

In S170, the switch determines whether or not the hop number count value acquired in S120 is 1, and if the hop number count value is 1, it is recognized that the switch is a switch (that is, the switch 11) connected to the monitoring device 30, and the process proceeds to S180.

In S180, the switch performs a configuration in which the mirror identifier is unnecessary. For example, the switch sets a flag indicating that no mirror identifier is required. The switch then proceeds to S190. The mirror identifier is a code of one or more bits inserted into the mirror frame and indicates that the frame is a mirror frame. Whether or not it is configured that the mirror identifier is unnecessary in S180 is determined in S350 and S410 of FIG. 5, which will be described later.

When it is determined in S170 that the hop number count value is not 1, the switch directly proceeds to S190.

In S190, the switch determines whether or not the total number of hops acquired in S120 is equal to the hop number count value, similarly to S130. Since the determination result in S130 is the same as the determination result in S190, the determination result in S130 may be referred to in S190.

When it is determined in S190 that the total number of hops and the hop number count value are not equal to each other, the switch proceeds to S200 and increments the hop number count value acquired in S120 by 1. In a next S210, the switch updates the hop number count value in the received configuration frame to a value incremented by 1, and outputs (that is, transmits) the configuration frame after the hop number count value has been updated from the port set as the mirror input port in S160. Thereafter, the switch ends the configuration process.

If it is determined in S190 that the total number of hops is equal to the hop number count value, the switch ends the configuration process as it is.

[4-2. Transfer Control Process]

Next, a transfer control process performed by each of the switches 11 to 15 for remote monitoring will be described with reference to FIG. 5.

Figure 5:
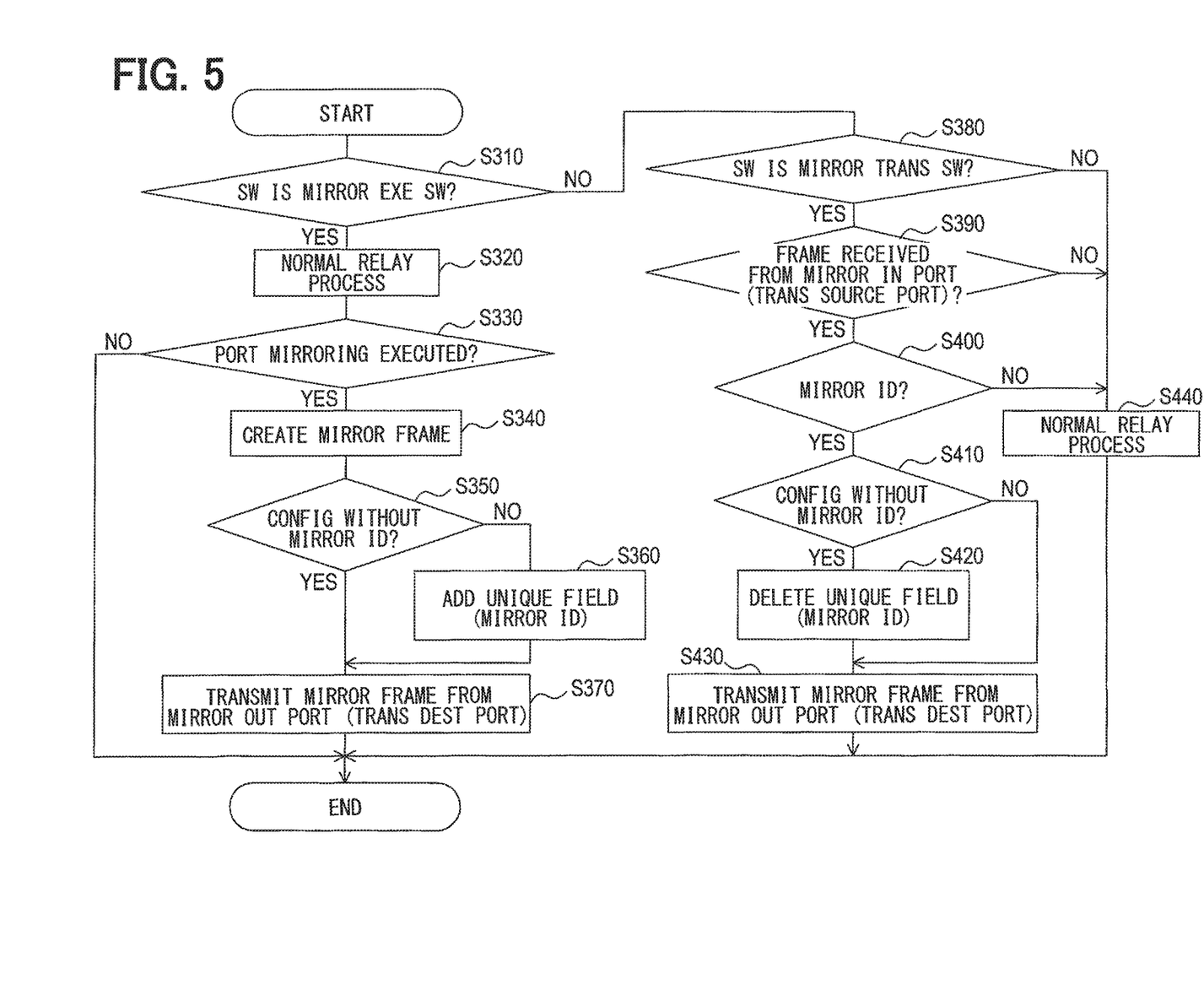
FIG. 5 is a flowchart showing a transfer control process for remote monitoring.

After receiving the configuration frame and performing the processing of S120 and subsequent steps in the configuration processing of FIG. 4, the switch performs the transfer control process of FIG. 5 when receiving the frame from any of the ports P0 to P7.

As shown in FIG. 5, in S310, the switch determines whether or not the switch is set to function as the mirror execution switch by the configuration process of FIG. 4, and if it is determined that the switch is set to function as the mirror execution switch, the process proceeds to S320.

In S320, the switch performs a process of relaying the received frame as the normal frame. In other words, a normal relay process is performed on the received frame.

After the relay process has been performed in S320, the switch proceeds to S330, and determines whether or not the port mirroring is performed. Specifically, when the configuration in S150 of FIG. 4 is the reception mirror and the frame is received from the monitor port set in S140 of FIG. 4, or when the configuration in S150 of FIG. 4 is the transmission mirror and the received frame is transmitted from the monitor port set in S140 of FIG. 4, the port mirroring is determined to be performed.

When it is determined in S330 that the port mirroring is not to be performed, the switch ends the transfer control process as it is, but when it is determined in S330 that the port mirroring is to be performed, the switch proceeds to S340.

In S340, when the configuration in S150 of FIG. 4 is the reception mirror, that is, when the reception mirror is implemented as the port mirroring, the switch creates a frame obtained by duplicating the received frame from the monitor port as the mirror frame.

When the configuration in S150 of FIG. 4 is a transmission mirror, that is, when the transmission mirror is implemented as the port mirroring, the switch creates a frame obtained by duplicating the frame transmitted from the monitor port as a mirror frame. Since the frame transmitted from the monitor port is the same as the received frame when the transmission mirror is implemented, in S440, the frame obtained by duplicating the received frame may be created as the mirror frame even when the transmission mirror is executed.

In a next S350, the switch determines whether or not the mirror identifier unnecessity has been configured in S180 of FIG. 4. Then, if the mirror identifier unnecessity has not been configured, that is, if the switch is not the switch 11, the switch proceeds to S360.

In S360, the switch adds the unique field shown in FIG. 3 to the mirror frame created in S340. In addition, the switch records the mirror identifier in the added unique field. That is, the configuration identifier and the security key are not recorded in the unique field added to the mirror frame, but the mirror identifier is recorded. Then, in a next S370, the switch outputs (that is, transmits) the mirror frame to which the unique field including the mirror identifier is added from the mirror output port set in S140 of FIG. 4, and then ends the transfer control process.

For that reason, the mirror frame to which the unique field including the mirror identifier has been added is transferred from the mirror execution switch to another switch (that is, the mirror transfer switch) on the side where the connection order is close to the monitoring device 30.

When it is determined in S350 that the mirror identifier unnecessity has been configured in S180 of FIG. 4, the switch proceeds to S370 without performing the processing of S360. Then, in S370 in this case, the switch outputs the mirror frame to which the unique field is not added from the mirror output port set in S140 of FIG. 4, and then ends the transfer control process.

The switch that proceeds from S350 to S370 is the switch 11 that is the mirror execution switch. In other words, when the switch 11 is a mirror execution switch, the process proceeds from S350 to S370, and the switch outputs a mirror frame to which a unique field is not added to the monitoring device 30.

On the other hand, if the switch determines in S310 that the switch is not configured to function as the mirror execution switch, the process advances to S380.

In S380, the switch determines whether or not the switch is configured to function as the mirror transfer switch by the configuration process of FIG. 4, and if it is determined that the switch is configured to function as the mirror transfer switch, the process proceeds to S390.

In S390, the switch determines whether or not the frame has been received from the mirror input port set in S160 of FIG. 4, and if it is determined that the frame has been received from the mirror input port, the switch proceeds to S400.

In S400, the switch determines whether or not the mirror identifier is included in the received frame from the mirror input port. Specifically, the switch determines whether or not the unique field is inserted in the received frame and whether or not the mirror identifier is included in the unique field.

When it is determined in S400 that the received frame includes the mirror identifier, the switch determines that the mirror frame has been received from the mirror input port, and proceeds to S410.

In S410, like S350, the switch determines whether or not the mirror identifier unnecessity has been configured in S180 of FIG. 4. If the mirror identifier unnecessity has been set, that is, if the switch is the switch 11, the switch proceeds to S420.

In S420, the switch deletes the unique field from the reception mirror frame, and makes a form of the mirror frame equal to that of the normal frame. With the deletion of the unique field, the mirror identifier is also deleted. Then, in a next S430, the switch outputs (that is, transmits) the mirror frame from which the unique field has been deleted from the mirror output port configured in S140 of FIG. 4, and then ends the transfer control process.

For that reason, the mirror frame transferred from the other switch to the switch 11 is transferred to the monitoring device 30 after the unique field has been deleted by the switch 11, that is, after the mirror frame has been returned to the normal frame.

When it is determined in S410 that the mirror identifier unnecessity is not configured in S180 of FIG. 4, that is, when the switch is the mirror transfer switch but not the switch 11, the switch proceeds to S430 without performing the processing in S420. Then, in S430 in this case, the switch outputs the mirror frame with the unique field added as it is from the mirror output port set in S140 of FIG. 4, and then ends the transfer control process.

For that reason, the mirror frame to which the unique field has been added is transferred from the mirror transfer switch which is not the switch 11 to another switch on the side where the connection order is close to the monitoring device 30.

On the other hand, if the switch determines in S380 that the switch is not configured to function as the mirror transfer switch, the process advances to S440. Then, in S440, similarly to S320, the switch performs the normal relay process on the received frame, and then ends the transfer control process.

When it is determined in S390 that the frame has not been received from the mirror input port, or when it is determined in the above S400 that the mirror identifier is not included in the received frame, the switch also proceeds to S 440, and then ends the transfer control process.

The processing of FIGS. 4 and 5 may be performed by one or multiple hardware included in the switch. For example, the hardware that implements the processes of FIGS. 4 and 5 may be implemented by a digital circuit or an analog circuit, or a combination of the digital circuit with the analog circuit. In addition, the switch may include a microcomputer, and a part or all of the processing of FIGS. 4 and 5 may be performed by the microcomputer. In that case, a part or all of the functions of the switch are realized by the CPU of the microcomputer executing a program stored in a non-transitory tangible storage medium. In this example, the memory corresponds to a non-transitory tangible storage medium in which the program is stored. When the execution of the program, a method corresponding to the program is executed.

5. Operation Example

Next, an operation example in which the switches 11 to 15 perform the processing of FIGS. 4 and 5 will be described.

In the communication network 1 shown in FIG. 1, for example, an example in which the remote monitoring is executed by the reception mirror with the ECU 23 connected to the switch 14 as a target, that is, the frame transmitted from the ECU 23 is monitored by the monitoring device 30 will be described.

In this instance, the microcomputer 10 in the ECU 20 transmits the configuration frame illustrated in FIG. 3 to the switch 11. As described above, the microcomputer 10 sets the hop number count value in the configuration frame to 1.

The switch 11 receives the configuration frame from the microcomputer 10, and performs the configuration process of FIG. 4. In the configuration process of FIG. 4, the switch 11 makes the determination of "YES" in S110 and S117, Then, in S120, the switch 11 acquires, from the configuration information region of the configuration frame, the transfer destination port and the transfer source port recorded corresponding to the number of hops (that is, "the number of hops=1") of the same number as the hop number count value in the configuration frame. For that reason, the switch 11 acquires the port P1 as the transfer destination port and acquires the port P6 as the transfer source port.

The switch 11 makes the determination of "NO" in S130, and configures the switch 11 to function as the mirror transfer switch in S160. Further, in S160, the switch 11 sets the port P6 acquired as the transfer source port as the mirror input port, and sets the port P1 acquired as the transfer destination port as the mirror output port.

In addition, the switch 11 makes the determination of "YES" in S170, and performs a configuration in which the mirror identifier is unnecessary in S180. Then, the switch 11 makes the determination of "NO" in S190, and outputs the configuration frame in which the hop number count value is incremented by 1 from the port P6 set as the mirror input port by the processing of S200 and S210. The configuration frame output from the port P6 of the switch 11, in which the hop number count value is updated to 2, is received by the switch 12.

The switch 12 receives the configuration frame from the switch 11, and performs the configuration process of FIG. 4.

Similarly to the switch 11, the switch 12 also performs the determination of "YES" in S110 and S117 in the configuration process of FIG. 4. Then, in S120, the switch 12 also acquires, from the configuration information region of the configuration frame, the transfer destination port and the transfer source port recorded corresponding to the number of hops (that is, "the number of hops=2") of the same number as the hop number count value in the configuration frame. For that reason, the switch 12 acquires the port P1 as the transfer destination port and acquires the port P6 as the transfer source port.

Similarly to the switch 11, the switch 12 also makes the determination of "NO" in S130, and configures the switch 12 to function as the mirror transfer switch in S160. Further, in S160, the switch 12 configures the port P6 acquired as the transfer source port as the mirror input port, and configures the port P1 acquired as the transfer destination port as the mirror output port.

On the other hand, the switch 12 makes the determination of "NO" in S170. For that reason, the switch 12 does not configure the mirror identifier unnecessity.

Then, the switch 12 makes the determination of "NO" in S190, and outputs the configuration frame in which the hop number count value is incremented by 1 from the port P6 configured as the mirror input port by the processing in S200 and S210. The configuration frame output from the port P6 of the switch 12, in which the hop number count value is updated to 3, is received by the switch 14.

The switch 14 receives the configuration frame from the switch 12, and performs the configuration process of FIG. 4.

Similarly to the switches 11 and 12, the switch 14 also makes the determination of "YES" in S110 and S117 in the configuration process of FIG. 4. Then, in S120, the switch 14 also acquires, from the configuration information region of the configuration frame, the transfer destination port and the transfer source port recorded in correspondence with the number of hops (that is, "the number of hops=3") of the same number as the hop number count value in the configuration frame. For that reason, the switch 14 acquires the port P1 as the transfer destination port and acquires the port P7 as the transfer source port.

Meanwhile, in order to receive a configuration frame in which the hop number count value is equal to the total number of hops, the switch 14 makes the determination of "YES" in S130 and configures the switch 12 to function as the mirror execution switch in S140. Further, in S140, the switch 14 configures the port P7 acquired as the transfer source port as the monitor port, and configures the port P1 acquired as the transfer destination port as the mirror output port. In the example of FIG. 3, since the I/O information included in the configuration frame is "I", the switch 14 performs the configuration of executing the reception mirror as the port mirroring in S150.

Similarly to the switch 12, the switch 14 makes the determination of "NO" in S170. For that reason, the switch 14 does not configure the mirror identifier unnecessity.

In order to make the determination of "YES" in S190, the switch 14 terminates the configuration process of FIG. 4 without transferring the configuration frame to another switch.

Therefore, when the microcomputer 10 transmits the configuration frame exemplified in FIG. 3, the configuration frame propagates in the stated order of the switch 11, the switch 12, and the switch 14 as indicated by an arrow Y1 of a dashed line in FIG. 1. The switches 11, 12, and 14 are configured as follows.

The switch 14 is set as the port mirroring and as the mirror execution switch that implements the reception mirror. The switch 11 and the switch 12 are set as mirror transfer switches.

In the switch 14, the port P7 to which the ECU 23 is connected is set as a monitor port, and the port P1 to which the switch 12 is connected is set as the mirror output port.

In the switch 12, the port P6 to which the port P1 of the switch 14 is connected is set as the mirror input port, and the port P1 to which the switch 11 is connected is set as the mirror output port.

In the switch 11, the port P6 to which the port P1 of the switch 12 is connected is set as the mirror input port, and the port P1 to which the monitoring device 30 is connected is set as the mirror output port.

In other words, the mirror frame mirrored by the switch 14 is set to be transferred to the monitoring device 30 through the switch 12 and the switch 11.

Among the switches 11, 12, and 14, the switch 11 to which the monitoring device 30 is connected is configured so that the mirror identifier is unnecessary.

Next, it is assumed that the ECU 23 transmits a frame destined for the ECU 24, for example, after configured as described above.

The frame transmitted by the ECU 23 is input to the ports P7 of the switch 14. Then, the switch 14 that has received the frame from the ECU 23 makes the determination of "yes" in S310 of FIG. 5, and transmits the frame (that is, the normal frame) from the ECU 23 from the port P5 in S320 of FIG. 5, thereby transferring the frame to the ECU 24. In FIG. 1, a solid arrow Y1 indicates that the normal frame is relayed from the ECU 23 to the ECU 24.

Since the switch 14 is configured to implement the reception mirror as the port mirroring and receives the frame from the port P7 configured as the monitor port, the switch 14 makes the determination of "YES" in S330 of FIG. 5. In other words, the switch 14 determines the execution of the port mirroring.

Therefore, in S340 of FIG. 5, the switch 14 creates a frame obtained by duplicating the received frame from the port P7 as the mirror frame. Then, the switch 14 makes the determination of "NO" in S350 of FIG. 5, and adds a unique field including the mirror identifier to the mirror frame in S360 of FIG. 5. Further, in S370 of FIG. 5, the switch 14 outputs the mirror frame to which the unique field is added from the port P1 set as the mirror output port.

The mirror frame output from the port P1 of the switch 14 is input to the port P6 of the switch 12.

The switch 12 that has received the mirror frame from the switch 14 makes the determination of "NO" in S310 of FIG. 3, and makes the determination of "YES" in S380 of FIG. 3. Further, the switch 12 determines "YES" in both S390 and S400 of FIG. 5. That is, the switch 12 determines that the mirror frame has been received from the port P6 set as the mirror input port.

The switch 12 outputs a mirror frame received from the switch 14, that is, a mirror frame with the unique field added, from the port P1 configured as the mirror output port in S430 of FIG. 5 in order to make the determination of "NO" in S410 of FIG. 5.

The mirror frame output from the port P1 of the switch 12 is input to the port P6 of the switch 11.

The switch 11 that has received the mirror frame from the switch 12 makes the determination of "NO" in S310 of FIG. 3, and makes the determination of "YES" in S380 of FIG. 3. Further, the switch 11 makes the determination of "YES" in both of S390 and S 400 of FIG. 5. In other words, similarly to the switch 12, the switch 11 also determines that the mirror frame has been received from the port P6 configured as the mirror input port.

The switch 12 makes the determination of "NO" in S410 of FIG. 5 whereas the switch 11 makes the determination of "YES" in S410 of FIG. 5. For that reason, in S420 of FIG. 5, the switch 11 deletes the unique field from the reception mirror frame. Then, in S430 of FIG. 5, the switch 11 outputs the mirror frame from which the unique field is deleted, that is, the mirror frame in the same form as the normal frame, from the port P1 configured as the mirror output port.

The mirror frame output from the port P1 of the switch 11 is input to the monitoring device 30. The monitoring device 30 monitors the mirror frame. In FIG. 1, a dotted arrow Y2 indicates that the mirror frame is transferred from the switch 14 to the monitoring device 30 through the switch 12 and the switch 11.

6. Advantages

According to the switches 11 to 15 of the embodiment described in detail above, the following advantages are obtained.

(a) Since the switches 11 to 15 perform the configuration process of FIG. 4, when a configuration frame is input to any port of the switch 11 to which the monitoring device 30 is connected, the configuration frame is propagated to the switch serving as the mirror execution switch, and the configuration of the above items (1) to (4) is completed. Therefore, configuration related to remote monitoring becomes easy. Note that S110 corresponds to the processing as the configuration determination unit. S 130 and S190 correspond to the processing as the comparison unit. S 160 corresponds to the processing as the first configuration unit. Steps S200 and S210 correspond to processing as the configuration transfer unit. S 140 corresponds to processing as the second configuration unit.

(b) Since the switches 11 to 15 perform the transfer control process shown in FIG. 5, remote monitoring based on the configuration content can be performed according to the configuration process shown in FIG. 4. Note that S330 to S370 correspond to the processing as the mirror execution unit. Steps S390 and S 400 correspond to the processing as the reception determination unit. Steps S 410 to S 430 correspond to the processing as the mirror transfer unit.

(c) When the switch functions as the mirror execution switch, the switch adds the unique field to the mirror frame and records the mirror identifier in the unique field in S360 of FIG. 5. When the switch functions as the mirror transfer switch, the switch determines whether or not the mirror frame has been received based on whether or not the mirror identifier is included in the received frame in S400 of FIG. 5. If the hop number count value in the received configuration frame is 1, the switch deletes the unique field from the reception mirror frame in S420 of FIG. 5 when the switch functions as the mirror transfer switch. Then, the switch that has performed the processing of S420 outputs the mirror frame from which the unique field has been deleted, from the port configured as the mirror output port.

Therefore, the switch functioning as the mirror transfer switch can easily determine whether or not the received frame is the mirror frame based on the mirror identifier, and can transfer the mirror frame of the same format as that of the normal frame to the monitoring device 30.

(d) The unique field to be added is a field provided between the source MAC address and the type field in the Ethernet frame. For that reason, the mirror identifier can be included in the mirror frame without affecting the Ethernet protocol.

(e) The configuration frame includes the configuration identifier. Then, in S110 of FIG. 4, the switch determines whether or not the configuration frame has been received based on whether or not the configuration identifier is included in the received frame. For that reason, the switch can easily determine whether or not the frame is a configuration frame.

(f) In the configuration frame, the configuration identifier is placed in the field added between the source MAC address and the type field (that is, the unique field). For that reason, the configuration identifier can be included in the configuration frame without affecting the Ethernet protocol.

The configuration frame includes the security key for authentication. Then, in the configuration processing of FIG. 4, when it is determined that the configuration frame has been received, the switch performs the authentication process using the security key in the authentication frame in S115, and when it is determined that the authentication is not successful by the authentication process in S117, the switch discards the configuration frame in S119. For that reason, the configuration related to the remote monitoring can be prevented from being performed by the configuration frame from an unauthorized device. Note that S115 to S119 correspond to processing as the authentication unit.

7. Other Embodiments

Although the embodiments of the present disclosure have been described above, the present disclosure is not limited to the embodiments described above, and various modifications can be made to implement the present disclosure.

For example, the communication protocol may be other than Ethernet. If only one of the reception mirror and the transmission mirror is implemented, I/O information may not be included in the configuration frame.

In addition, a plurality of functions including one component in the above embodiment may be realized by a plurality of components, or a function of one component may be realized by a plurality of components. In addition, a plurality of functions including a plurality of components may be realized by one component, or a function realized by a plurality of components may be realized by one component. In addition, a part of the configuration of the above embodiment may be omitted. In addition to the switches described above, the present disclosure can be realized in various forms such as a system including the switch as a component, a program for causing a computer to function as the switch, a non-transitory tangible recording medium such as a semiconductor memory in which the program is recorded, and a setting method of remote monitoring.

The electronic control device as controllers and methods described in the present disclosure may be implemented by a special purpose computer created by configuring a memory and a processor programmed to execute one or more particular functions embodied in computer programs. Alternatively, the electronic control device as controllers and methods described in the present disclosure may be implemented by a special purpose computer created by configuring a processor provided by one or more special purpose hardware logic circuits. Alternatively, the electronic control device as controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay device which is one of a plurality of relay devices in a communication network, the relay device comprising:
a processor, the processor is configured to
determine whether a configuration frame is received, wherein
the configuration frame provides an instruction to transfer a mirror frame from one of the plurality of relay devices to a monitor device via an other one of the plurality of relay devices;
the mirror frame is duplicated by executing a port mirroring in the one of the plurality of relay devices;
the one of the plurality of relay devices executing the port mirroring is defined as an execution relay device;
the other one of the plurality of relay devices disposed in a transfer path between the execution relay device and the monitor device and transferring the mirror frame is defined as a transfer relay device;

each of the execution relay device and the transfer relay device is defined as a target relay device;

one of the target relay devices initially connecting to the monitor device is defined as a first-stage relay device;

the configuration frame is initially input into the first-stage relay device, and propagates through each target relay device;

the configuration frame includes a configuration information region for storing a propagation number information, a total number of the target relay devices, a transfer destination information and a transfer source information;

the propagation number information indicates a numerical number of propagations as a numerical number of target relay devices to which the configuration frame has propagated;

the configuration frame propagates in a propagation order of the target relay devices;

the first-stage relay device has a first order of the propagation order;

the transfer destination information and the transfer source information relates to the target relay devices in the propagation order in association with each propagation order;

the transfer destination information indicates a mirror output port that outputs the mirror frame to be transferred to the monitoring device;

the transfer source information recorded in association with a same order of the propagation order as the total number of the target relay devices indicates a monitor port as an object of the port mirroring;

the transfer source information recorded in association with an order of the propagation order smaller than the total number of the target relay devices indicates a mirror input port to which the mirror frame is input from the other one of the plurality of relay devices;

the processor is further configured to determine whether the numerical number of propagations at reception time is equal to the total number of the target relay devices in a received configuration frame when the processor determines that the configuration frame is received;

the numerical number of propagations at the reception time is indicated by the propagation number information in the received configuration frame;

when the processor determines that the numerical number of propagations at the reception time is not equal to the total number of the target relay devices; set the relay device to function as the transfer relay device; set a port indicated in the transfer source information to be the mirror input port when the transfer source information and the transfer destination information in the configuration information region of the configuration frame are associated with the same order of the propagation order as the numerical number of propagations at the reception time; and set a port indicated in the transfer destination information to be the mirror output port;

when the processor determines that the numerical number of propagations at the reception time is not equal to the total number of the target relay devices; update the propagation number information in the configuration frame to be new propagation number information indicating the numerical number of propagations incremented by 1 from the numerical number of propagations at the reception time; and output the configuration frame after the propagation number information is updated from the port set as the mirror input port by the processor; and when the processor determines that the numerical number of propagations at the reception time is equal to the total number of the target relay devices; set the relay device to function as the execution relay device; set a port indicated in the transfer source information to be the monitor port when the transfer source information and the transfer destination information in the configuration information region of the configuration frame are associated with the same order of the propagation order as the numerical number of propagations at the reception time; and set a port indicated in the transfer destination information to be the mirror output port.

2. The relay device according to claim 1, wherein the processor is further configured to perform the port mirroring on a port which is set as the monitor port by the processor when the relay device is set to function as the execution relay device by the processor; and output the mirror frame duplicated by the port mirroring from the port set as the mirror output port by the processor;

determine whether the mirror frame is received from the port set as the mirror input port by the processor when the relay device is set to function as the transfer relay device by the processor; and output a received mirror frame from the port set as the mirror output port by the processor when the processor determines that the mirror frame is received from the port set as the mirror input port.

3. The relay device according to claim 2, wherein the processor is further configured to:

add a field at a predetermined position in a duplicated mirror frame, and record a mirror identifier, which indicates that the frame is a mirror frame, in an added field, and determine whether the mirror frame is received based on determination whether the mirror identifier is included in a received frame.

4. The relay device according to claim 3, wherein the processor is further configured to:

delete the added field from the received mirror frame, and output the mirror frame, from which the field is deleted, from the port set as the mirror output port when the numerical number of propagations at the reception time is 1.

5. The relay device according to claim 3, wherein:

the relay device is an Ethernet relay device; and the added field is disposed between a source MAC address and a type field in an Ethernet frame.

6. The relay device according to claim 1, wherein:

the configuration frame includes a configuration identifier which indicates that the frame is the configuration frame; and wherein the processor is further configured to determine whether the configuration frame is received based on determination whether the configuration identifier is included in the received frame.

7. The relay device according to claim 6, wherein:

the relay device is an Ethernet relay device; and the configuration identifier is disposed in a field added between the source MAC address and the type field in the Ethernet frame.

8. The relay device according to claim 1, wherein the processor is further configured to:
    perform an authentication process using a security key for authentication when the processor determines that the configuration frame is received, and discard the received configuration frame when authentication is not successful in the authentication process, wherein:
    the configuration frame includes the security key for authentication.

* * * * *